United States Patent [19]

Inoue et al.

[11] Patent Number: 4,797,264
[45] Date of Patent: Jan. 10, 1989

[54] RECOVERY OF METALS ADSORBED ON CHELATING AGENTS

[75] Inventors: Yasuhiko Inoue; Masaaki Matsuda; Yoshirou Akiyoshi, all of Ehime, Japan

[73] Assignee: Sumitomo Chemical Company, Limited, Osaka, Japan .

[21] Appl. No.: 867,061

[22] Filed: May 27, 1986

[30] Foreign Application Priority Data

May 28, 1985 [JP] Japan .................. 60-115089
Jun. 17, 1985 [JP] Japan .................. 60-131199

[51] Int. Cl.$^4$ .................. C01G 43/00; B01J 45/00; B01J 49/00
[52] U.S. Cl. .................. 423/7; 210/673; 210/674; 210/688; 210/692; 423/49; 423/54; 423/63; 423/70; 423/89; 423/DIG. 14
[58] Field of Search .................. 423/7, 22, 24, 112, 423/139, 49, 54, 63, 70, 89, DIG. 14; 210/673, 674, 688, 692

[56] References Cited

U.S. PATENT DOCUMENTS

| 2,830,874 | 4/1958 | Long et al. | 423/7 |
| 2,864,667 | 12/1958 | Bailes et al. | 423/7 |
| 3,804,945 | 4/1974 | Scott et al. | 423/658.5 |
| 3,883,490 | 5/1975 | Fujimoto et al. | 260/79.5 NV |
| 3,892,689 | 7/1975 | Motani et al. | 423/22 |
| 3,935,006 | 1/1976 | Fischer | 423/24 |
| 4,107,099 | 8/1978 | Hedge | 423/23 |
| 4,298,578 | 11/1981 | Yan | 423/7 |
| 4,376,099 | 3/1983 | Yamamoto et al. | 427/54 |
| 4,468,374 | 8/1984 | Kataoka et al. | 423/112 |
| 4,559,216 | 12/1985 | Nagai et al. | 423/139 |
| 4,565,673 | 1/1986 | Kataoke et al. | 423/24 |

FOREIGN PATENT DOCUMENTS

| 0148158 | 7/1985 | European Pat. Off. . |
| 0171704 | 2/1986 | European Pat. Off. . |
| 3005163 | 8/1981 | Fed. Rep. of Germany . |

OTHER PUBLICATIONS

Perry, *Chemical Engineers Handbook*, 5th Ed., pp. 15-2 & 3 and 16-38, McGraw-Hill Book Co. (1973) New York.

Primary Examiner—Edward A. Miller
Attorney, Agent, or Firm—Cushman, Darby & Cushman

[57] ABSTRACT

Chelating agents on which metals such as uranium have been adsorbed are brought into contact with an eluent of aqueous solution containing reducing agents and basic compounds, until the metals are eluted. The elution is effected with large speed without degradation of the chelating agents. Preferred chelating agents are rather stable under basic conditions but not under acidic conditions, for example, those having =NOH group in their molecules. The reducing agents and basic compounds in the eluent are, for example, sulfurous acid or salts thereof and sodium hydroxide, respectively.

6 Claims, No Drawings

RECOVERY OF METALS ADSORBED ON CHELATING AGENTS

The present invention relates to recovery of metals from those which have been adsorbed on chelating agents. More particularly, it pertains to elution of metals from chelating agents which have adsorbed metals by bringing the agents into contact with an eluent of basic aqueous solution containing one or more reducing agents.

Elution of metals from chelating agents on which metals have been adsorbed is conducted, in conventional processes, by making the chelating agents in contact with aqueous solution of such mineral acids as sulfuric acid, hydrochloric acid and the like. Difficulty encountered in this process is that elution efficiency is low due to decomposition of functional groups of the chelating agents, when the functional groups are oxime group, phosphoric acid ester group or the like which are not resistant to acids. Furthermore, elution of metals such as molybdenum, vanadium, uranium and the like from strong acid ion-exchange resins or chelating agents containing such phosphorus functional groups as $-PO(OR)_2$, $-PH(OR)_3$, etc. is very hard, since the metals are strongly bonded to the resins or chelating agents, R above being same or different and standing for a hydrogen atom, a phenyl group, an alkyl group or an alkenyl group. To this effect, the mineral acid solution of an eluent is forced to contain a large amount of hydrogen peroxide or metal ions.

After extensive studies on elution of metals in the solution form from those adsorbed on chelating agents, the present inventors have found that the elution is carried out in a very short period of time and with high efficiency, if an eluent used is basic aqueous solution containing reducing agents. Degradation of the chelating agents is very small, since the elution is able to effect even with an eluent having small concentration of ingredients. Metal concentration to be eluted may be high, because the efficiency of elution is very high. In addition thereto, it is possible to elute heavy metals from chelating agents having specific functional groups such as $-P(OR)_2$, $-PO(OR)_2$, $=NOH$, $-N^{\oplus}(R)_3$, etc. which strongly bond to these heavy metals.

According to the present invention, chelating agents on which metals have been adsorbed are brought into contact with aqueous solution containing reducing agents and basic compounds, until the metals are eluted in the solution form.

The chelating agents in the present invention are not limitative. Preferred are those containing in their molecule at least one functional group selected from $-P(OR)_2$, $-PO(OR)_2$, $-PH(OR)_3$, $-SR$, $=NOH$, $-N(R)_2$, $-^{\oplus}N(R)_3$ and metal salts thereof, wherein symbol R may be same or different and represents a hydrogen atom, a phenyl group, an alkyl group or an alkenyl group. These preferred chelating agents are stable under basic conditions but not under acidic conditions. Concrete examples are, for example, (1) chelate resins having amidoxime groups where hydroxylamine or derivatives thereof are allowed to react with homopolymers of vinyl cyanide monomers such as acrylonitrile, α-chloroacrylonitrile, vinylidene cyanide and methacrylonitrile or with copolymers of vinyl cyanide monomers and ethylenically unsaturated comonomers polymerizable therewith; (2) resins of homopolymers of vinyl cyanide derivatives obtained by allowing hydroxylamine or derivatives thereof to react with vinyl cyanide monomers such as acrylonitrile, α-chloroacrylonitrile, vinylidene cyanide, or methacrylonitrile, or resins of copolymers of the vinyl cyanide derivatives and ethylenically unsaturated comonomers polymerizable therewith; (3) chelate resins having phosphinic group or phosphonium base which are obtained by allowing phosphine compounds such as lithium diphenylphosphine, sodium diphenylphosphine, lithium phenylphosphine and tricresylphosphine or mixtures thereof to react with styrene-divinylbenzene copolymer, phenol resin, polyethylene or polypropylene containing halogenated alkyl groups such as chloromethyl or bromomethyl group or a halogen atom such as bromine or iodine; (4) chelate resins having phosphonate group obtained by allowing derivatives of phosphorous acid such as triethyl phosphite, triphenyl phosphite, or trimethyl phosphite or mixtures thereof (hereinafter referred to as phosphorous acid derivatives) to react with styrene-divinylbenzene copolymer, phenol resin, aniline resin or m-phenylene resin containing halogenated alkyl group such as chloromethyl or bromomethyl group (hereinafter referred to as halogenated alkyl group-containing resins); (5) chelate resins having aminoalkylene phosphate group which are obtained by allowing halogenated alkyl phosphates such as diethyl chloromethylphosphonate, ethyl chloromethylphosphonate, diphenyl chloromethylphosphonate, dicresyl chloromethylphosphonate or ethyl chloromethylphosphonate or mixtures thereof to react with resins having primary or secondary amino groups; (6) chelate resins having aminoalkylene phosphoric acid group which are obtained by hydrolysis of the chelate resins having aminoalkylene phosphate group in (5) above or by being similarly prepared to (5) above except that the phosphorous acid derivatives are replaced by phosphorous acid; (7) chelate resins having tertiary or quaternary amino group which are obtained by allowing dimethylamine, diethylamine, trimethylamine, triethylamine or dimethylethanolamine to react with styrene-divinylbenzene copolymer having halogenated alkyl groups such as chloromethyl group or bromomethyl group or halogen atoms such as bromine or iodine; (8) chelating agents hardly soluble in water such as dibutyl phosphate, 2-ethylhexyl-phenylphosphonate, dibutyl [(diethyl-carbamoyl)methyl]phosphate, di-(2-ethyl-hexyl)phosphate, 4-nonyl-salicylaldoxime, o-hydroxy-p-nonylacetophenonealdoxime, laurylamidoxime, 4-octylbenzamidoxime, 2-ethylhexylisobutyl dithiophosphate, etc.

The metal salts in the chelating agents are those where the functional groups bond to metals by ionic bond, chelate bond or complex bond. Any metals to this effect may be employed as long as bonding force of the metals in the salts is smaller than that between the functional groups above and metals to be eluted. Metals of the salts are usually alkali or alkaline earth metals such as sodium, potassium, calcium and magnesium.

Any chelating agents may be used, no matter how the metals to be eluted are adsorbed thereon. Metals adsorbed are not limitative but preferably those readily form oxides or oxygen-containing compounds thereof, for example, uranium, molybdenum, rhenium, titanium, vanadium, germanium, tungsten, etc.

Composition of the present eluent is critical. The eluent has to contain reducing agents and basic compounds, both of which having specific concentrations, respectively. Preferred eluent of the present invention is aqueous solution containing 0.001-3N of the reducing agents and 0.05N or more, usually up to 6N, of the basic compounds. Recovery of metals with desired elution speed without degradation of the chelating agents is hardly expected, unless the eluent does not satisfy the requirements specified above. No substantial elution occurs when concentration of the reducing agents are smaller than 0.001N. Even if elution is effected, elution speed is very small and it takes a long time for elution. No greater elution effect is expected, either, when the reducing agents is greater than 3N. It takes a long time to elute, as long as concentration of the basic compounds is smaller than 0.05N, even if concentration of the reducing agents is 0.001-3N.

The reducing agents in the present eluent may be lower oxides of inorganic acids such as sulfurous acid, nitrous acid, sulfur dioxide and thiosulfuric acid, etc. and metal salts thereof; metal hydrides such as sodium boro-hydride, hydrogen peroxide or metal salts thereof; hydrazine, hydroxylamine, hydroquinone, oxalic acid, formaldehyde or derivatives thereof.

The basic compounds in the present eluent may be inorganic alkaline compounds such as sodium hydroxide, potassium hydroxide, calcium hydroxide, magnesium hydroxide and ammonia; and water soluble organic amines such as ethylenediamine, diethylenetriamine, diethylamine and triethylamine, etc.

The present eluent is usually aqueous solution, but may contain organic solvents as long as they do no harm on the elution.

Any amount of the eluent may be employed. Preferred amount may easily be decided after preliminary tests, since the amount varies depending on eluents and concentration thereof, chelating agents, metals adsorbed and amount thereof employed.

Temperature at which elution is effected is not critical, but usally 0°-100° C. Period of time for elution is not limitative, either.

Any elution manner may be employed. The eluent may be flowed in a column in which chelating agents are packed. Alternatively, resinous chelating agents are immersed in the eluent solution before filtration. Another process is that chelating agents in the liquid form are added to the eluent and the mixture is stirred and left to stand until separation is effected.

Metals are recovered from a solution containing metals eluted (hereinafter referred to as eluate). Neutralization and filtration of the eluate gives hydroxides of metals. Treatment of the eluate with a reducing agent and then electrolysis yields metals.

Chelating agents from which metal ions have been removed may be recycled as they are in order to have them used again as metal-adsorbing agents. Alternatively, before being recycled, they may be purified by a treatment with water containing or not basic materials such as sodium hydroxide, potassium hydroxide, calcium hydroxide, magnesium hydroxide, ammonia, etc. or acid such as hydrochloric acid, sulfuric acid, nitric acid, phosphoric acid, etc.

EXAMPLES 1-13 and COMPARISON EXAMPLES 1-4

Aqueous sulfuric acid solution containing 100 mg/l of uranium was flowed downwardly for one hour with 10 hr$^{-1}$ of space velocity in a column (inner diameter: 10 mm) packed with ten ml of "Sumichelate" ® MC-95 which is a chelating agent having aminomethylene phosphonate, manufactured by Sumitomo Chemical Company, Limited, in order to adsorb uranium on the chelating agent.

Eluent having the composition as shown in Table 1 was flowed downwardly for one hour with 10 hr$^{-1}$ of space velocity under room temperature to elute uranium adsorbed above. Concentration of uranium in eluates are also shown in Table 1.

TABLE 1

| | Eluents | Concentration of U in eluates (mg/l) |
|---|---|---|
| Examples | | |
| 1 | 0.005 N $H_2SO_3$/0.05 N KOH | 99 |
| 2 | 0.001 N $Na_2SO_3$/0.5 N NaOH | 100 |
| 3 | 0.05 N $NaNO_2$/0.05 N $Ca(OH)_2$ | 99 |
| 4 | 0.01 N $SO_2$/0.5 N NaOH | 100 |
| 5 | 0.05 N $NaBH_4$/0.5 N NaOH | 99 |
| 6 | 0.5 N $H_2SO_3$/1 N $NH_3$ | 100 |
| 7 | 1 N $Na_2SO_3$/0.05 N ethylenediamine | 99 |
| 8 | 1 N $NaNO_2$/1 N triethylamine | 99 |
| 9 | 0.05 N $H_2O_2$/0.5 N KOH | 100 |
| 10 | 0.05 N hydroxylamine/0.1 N diethylenetriamine | 100 |
| 11 | 0.05 N phenylhydrazine/ 0.5 N KOH | 100 |
| 12 | 0.05 N hydroquinone/0.5 N diethylamine | 99 |
| 13 | 2 N hydrazine/0.5 N NaOH | 99 |
| Comparison Examples | | |
| 1 | 50% $H_2SO_4$ | 17 |
| 2 | 2 N NaOH | 0 |
| 3 | 2 N $NH_3$ | 0 |
| 4 | 0.5 N $Na_2SO_3$ | 0 |

EXAMPLE 14

Solution (1500 ml) containing 120 mg/l of molybdenum and 10 weight % of NaCl was flowed for three hours in a column (inner diameter 10 mm) packed with resinous chelating agent (50 ml) having —CS(SH) group obtained by allowing ethylenediamine and carbon disulfide to react with copolymer of acrylonitrile and divinylbenzene, until adsorption of molybdenum was effected on the chelating agent. After water (200 ml) was flowed, aqueous solution (1000 ml) containing both 0.1N of hydroxylamine and 0.5N of sodium hydroxide was flowed for one hour under room temperature in order to elute molybdenum adsorbed above. Then, the column was washed with deionized water (200 ml) to regenerate the chelating agent. The above flowing of molybdenum-containing solution—the elution—the regeneration was made one cycle and the cycles were repeated 20 times. Adsorption rate of molybdenum at 20th cycle was 98% assuming 100 at the 1st cycle.

COMPARISON EXAMPLE 5

Example 14 was repeated except the eluent was replaced by 2N aqueous sulfuric acid solution. Adsorption rate of molybdenum at the 20th cycle was 12% assuming 100 at the 1st cycle.

EXAMPLES 15-29

0.5N aqueous hydrochloric acid solution (100 ml) containing 100 mg/l of rhenium each was brought into contact for three hours with a chelating agent (5 ml) each listed in A-O below, respectively, in order to obtain chelating agents or solutions thereof which adsorbed rhenium. Amounts of rhenium adsorbed are shown in Table 2.

Each chelating agent which adsorbed rhenium was mixed with aqueous solution (50 ml) each containing 0.01N of sodium sulfite and 0.5N of sodium hydroxide and the mixture each was left to stand for 3 hours. Amounts of rhenium eluted are shown in Table 2.

COMPARISON EXAMPLES 6-20

Examples 15-29 were repeated except the eluents were replaced by 2N sulfuric acid. Amounts of rhenium eluted are shown in Table 2.

Chelating agent A

Resin having =NOH group, =NH group, —NH$_2$ group and —NHNH$_2$ group obtained by allowing hydroxylamine sulfate and aqueous hydrazine solution to react with copolymer of acrylonitrile and divinylbenzene.

Chelating agent B

Resin having quaternary phosphonium base obtained by allowing chloromethylated polystyrene (200 parts by weight) to react with tributylphosphine (200 parts by weight) in a solvent of dimethylformamide.

Chelating agent C

Resin having quaternary phosphonium base obtained by allowing chloromethylated polystyrene (200 parts by weight) to react with triphenylphosphine (260 parts by weight) in a solvent of dimethylformamide.

Chelating agent D

Resin having phosphine group obtained by allowing lithium polystyrene defined below to react with chlorodiphenylphosphine (300 parts by weight) in a solvent of tetrahydrofuran and oxidizing with 40 % peracetic acid (371 parts by weight) in a solvent of methylenechloride, said lithium polystyrene being obtained by allowing brominated polystyrene (150 parts by weight) to react with 1.6 mol % n-butyllithium-hexane (64 parts by weight) in a solvent of tetrahydrofuran.

Chelating agent E

Resin having sodium sulfonate obtained by hydrolysis of the chelating agent B above in 20 % aqueous sodium hydroxide solution.

Chelating agent F

Resin having phosphinic acid group obtained by allowing polystyrene (100 parts by weight) to react with phosphorus trichloride (150 parts by weight) in a solvent of chloroform and then hydrolysis of the reaction product.

Chelating agent G

Resin having phosphinate group obtained by allowing aminated polystyrene (100 parts by weight) to react with cresyl chloromethylphosphonate (120 parts by weight) in a solvent of 1,2-dichloroethane.

Chelating agent H

Resin having diethylenetriaminomethylene phosphoric acid group, "Sumichelate" ® MC-95 (manufactured by Sumitomo Chemical Company,-Limited).

Chelating agent I

Resin obtained by allowing 1,2-benzisoxazol-3-acetoamidoxime and resorcinol to react with formaline.

Chelating agent J

Vinyldiamidoxime-divinylbenzene-acrylic acid copolymer resin obtained by allowing vinylidene cyanidedivinylbenzene-methyl acrylate copolymer to react with hydroxylamine.

Chelating agent K

That having iminodiacetic acid group, "Sumichelate" ® MC-30 manufactured by Sumitomo Chemical Company, Limited.

Chelating agent L 2-ethylhexyl phenylphosphonate

Chelating agent M

Dibutyl [(diethylcarbamoyl)methyl]phosphonate

Chelating agent N 4-dodecylbenzylaminomethylene phosphonic acid

Chelating agent O 2-ethylhexylisobutyldithiophosphoric acid.

TABLE 2

| | Chelating agents | Rhenium adsorbed (mg) | Rhenium eluted (mg) |
|---|---|---|---|
| Examples | | | |
| 15 | A | 8.1 | 8.1 |
| 16 | B | 9.7 | 9.6 |
| 17 | C | 8.8 | 8.8 |
| 18 | D | 8.6 | 8.6 |
| 19 | E | 7.5 | 7.5 |
| 20 | F | 9.4 | 9.4 |
| 21 | G | 8.9 | 8.8 |
| 22 | H | 9.2 | 9.2 |
| 23 | I | 7.3 | 7.1 |
| 24 | J | 9.6 | 9.6 |
| 25 | K | 5.9 | 5.9 |
| 26 | L | 8.4 | 8.2 |
| 27 | M | 8.3 | 8.2 |
| 28 | N | 7.0 | 7.0 |
| 29 | O | 8.0 | 7.8 |
| Comparison Examples | | | |
| 6 | A | 8.1 | 0 |
| 7 | B | 9.7 | 1.3 |
| 8 | C | 8.8 | 0.8 |
| 9 | D | 8.6 | 0.3 |
| 10 | E | 7.5 | 0.3 |
| 11 | F | 9.4 | 0.5 |
| 12 | G | 8.9 | 1.1 |
| 13 | H | 9.2 | 0 |
| 14 | I | 7.3 | 0 |
| 15 | J | 9.6 | 0 |
| 16 | K | 5.9 | 0.7 |
| 17 | L | 8.4 | 0.8 |
| 18 | M | 8.3 | 2.4 |
| 19 | N | 7.0 | 0 |
| 20 | O | 8.0 | 1.8 |

EXAMPLES 30-33 and COMPARISON EXAMPLES 21-24

Various chelating agents (10 ml each) which had adsorbed metals shown in Table 3 were packed in a column (inner diameter 10 mm), respectively. Eluents shown in Table 3 were flowed downwardly at room temperature for six hours with 5 hr$^{-1}$ of space velocity. Amounts of metals eluted are shown in Table 3.

TABLE 3

| | Chelating agents | Eluents | | Metals adsorbed (mg) | Metals eluted (mg) |
|---|---|---|---|---|---|
| Examples | | | | | |
| 30 | H | 0.02 N $H_2O_2$/1 N NaOH | Ti | 38 | 38 |
| 31 | A | 0.1 N hydrazine/ 0.5 N $NH_3$ | V | 32 | 32 |
| 32 | "Duolite" ® A-161* | 0.05 N $SO_2$/1 N KOH | Ge | 26 | 26 |
| 33 | "Sumichelate" ® MC-10 | 0.02 N $Na_2SO_3$/1 N NaOH | W | 35 | 35 |
| Comparison Examples | | | | | |
| 21 | H | 2 N $H_2SO_4$ | Ti | 38 | 11 |
| 22 | A | 2 N $NH_3$ | V | 32 | 0 |
| 23 | "Duolite" ® A-161* | 0.05 N $SO_2$ | Ge | 26 | 0 |
| 24 | "Sumichelate" ® MC-10 | 1 N NaOH | W | 35 | 0 |

*Diamond Schamrock Corp.

We claim:

1. A method for eluting a metal absorbed on a chelating resin, said metal being uranium, molybdenum, rhenium, titanium, vanadium, germanium, or tungsten, said agent having at least one of the functional groups selected from the group consisting of —NOH, —P(OR)$_2$, —PO(OR)$_2$, —PH(OR)$_3$, —SR, N(R)$_2$, —N$^{+(R)}$$_3$, and alkali or alkaline earth metal salts thereof where R may be the same or different and stands for a hydrogen atom, phenyl group, alkyl group or alkenyl group, which comprises:
   bringing the chelating resin having the metal absorbed thereon into contact with an eluent containing both
   (1) at least one reducing agent selected from the group consisting of sulfurous acid, nitrous acid, thiosulfuric acid and, their alkali metal salts, sodium borohydride, hydrogen peroxide, sulfur dioxide, hydrazine, phenylhydrazine, hydroxylamine, hydroquinone, oxalic acid, and formaldehyde, and
   (2) at least one basic compound selected from the group consisting of inorganic alkaline compounds and water soluble organic amines.

2. A method according to claim 1 wherein the eluent is an aqueous solution.

3. A method according to claim 2 wherein concentration of the reducing agent is 0.001–3N and that of the basic compound is 0.05N or more.

4. A method according to claim 3 wherein the basic compound is sodium hydroxide, potassium hydroxide, calcium hydroxide, magnesium hydroxide, ammonia, ethylenediamine, diethylenetriamine, diethylamine or triethylamine.

5. A method for eluting uranium, molybdenum, rhenium, titanium, germanium, or tungsten adsorbed on a chelating resin having an aminomethylene phosphonic acid group, which comprises bringing the chelating resin into contact with an eluent containing both hydrogen peroxide and sodium hydroxide.

6. A method for eluting uranium, molybdenum, rhenium, titanium, vanadium, germanium, or tungsten absorbed on a chelating resin, which comprises:
   bringing the chelating resin having said metal adsorbed thereon into contact with an eluent (aqueous solution) containing:
   (1) 0.001–3N of at least one reducing agent selected from the group consisting of sulfurous acid, nitrous acid, thiosulfuric acid and, their alkali metal salts, sodium borohydride, hydrogen peroxide, sulfur dioxide, hydrazine, phenylhydrazine, hydroxylamine, hydroquinone, oxalic acid, and formaldehyde, and
   (2) 0.05N–6N of at least one basic compound selected from the group consisting of sodium hydroxide, potassium hydroxide, calcium hydroxide, magnesium hydroxide, ammonia, ethylenediamine, diethylene amine, or triethylamine.

* * * * *